(12) United States Patent
Choi

(10) Patent No.: US 7,532,298 B2
(45) Date of Patent: *May 12, 2009

(54) FABRICATION METHOD OF AN IN-PLANE SWITCHING MODE LIQUID CRYSTAL DISPLAY DEVICE COMPRISING FIRST AND SECOND FERROELECTRIC LIQUID CRYSTAL LAYERS HAVING DIFFERENT ROTATIONAL VELOCITIES OF THEIR SPONTANEOUS POLARIZATIONS

(75) Inventor: Su-Seok Choi, Seongnam-si (KR)

(73) Assignee: LG. Display Co., Ltd., Seoul (KR)

( * ) Notice: Subject to any disclaimer, the term of this patent is extended or adjusted under 35 U.S.C. 154(b) by 361 days.

This patent is subject to a terminal disclaimer.

(21) Appl. No.: 11/165,313

(22) Filed: Jun. 23, 2005

(65) Prior Publication Data
US 2006/0146251 A1    Jul. 6, 2006

(30) Foreign Application Priority Data
Dec. 30, 2004    (KR) .................... 10-2004-0116723

(51) Int. Cl.
*C09K 19/02*    (2006.01)
(52) U.S. Cl. .................. 349/172; 349/133; 349/141
(58) Field of Classification Search ............. 349/141, 349/123–136, 172
See application file for complete search history.

(56) References Cited

U.S. PATENT DOCUMENTS

| 6,985,200 B2* | 1/2006 | Miyachi et al. ............ 349/127 |
| 7,215,400 B2* | 5/2007 | Choi ........................... 349/141 |
| 2003/0203130 A1 | 10/2003 | Geisow et al. |
| 2004/0057001 A1* | 3/2004 | Kim ............................ 349/123 |
| 2005/0179855 A1* | 8/2005 | Helgee et al. ............... 349/172 |

FOREIGN PATENT DOCUMENTS

WO    WO 00/03288    1/2000

OTHER PUBLICATIONS

Search Report dated Sep. 23, 2005 for corresponding European Application No. 05 01 4215.
*Electrically commanded surfaces: A new liquid-crystal-display concept*, Journal of the Society for Information Display, vol. 11, No. 3, 2003, pp. 437-441.
*Alignment of liquid crystals which exhibit cholesteric to smectic C\* phase transitions*, Journal of Applied Physics, American Institute of Physics. New York, US, Vo. 59, No. 7, pp. 2355-2360.

(Continued)

Primary Examiner—Andrew Schechter
Assistant Examiner—Charles Chang
(74) *Attorney, Agent, or Firm*—Brinks Hofer Gilson & Lione

(57) ABSTRACT

An in-plane switching mode liquid crystal display device comprises a first substrate including a pixel region and a pixel electrode in the pixel region; a second substrate facing the first substrate and including a common electrode; first and second alignment layers disposed on the entire surfaces of the pixel electrode and the common electrode; first and second ferroelectric liquid crystal layers coated on the first and second alignment layers and including first and second spontaneous polarizations; and a twisted nematic liquid crystal layer interposed between the first and second ferroelectric liquid crystal layers.

18 Claims, 10 Drawing Sheets

OTHER PUBLICATIONS

*Molecular origin of ferroelectricity in induced smectic-C\* liquid crystalline phases*, Physical Review E PAS Through AIP USA, vol. 54, No. 6, pp. 6387-6403.

*Interplay between dielectric and ferroelectric couplings in twisted smectic C\* liquid crystals*, Ferroelectrics Gordon & Breach Switzerland, vol. 179, No. 1-4, 1996, pp. 181-190.

\* cited by examiner

FABRICATION METHOD OF AN IN-PLANE SWITCHING MODE LIQUID CRYSTAL DISPLAY DEVICE COMPRISING FIRST AND SECOND FERROELECTRIC LIQUID CRYSTAL LAYERS HAVING DIFFERENT ROTATIONAL VELOCITIES OF THEIR SPONTANEOUS POLARIZATIONS

This application claims the benefit of Korean Patent Application No. 2004-0116723, filed in Korea on Dec. 30, 2004, the entire contents of which are herein incorporated by reference.

BACKGROUND

1. Field of the Invention

The invention relates to an in-plane switching mode liquid crystal display device and more particularly, an in-plane switching mode liquid crystal display device having a fast response and an improved transmittance.

2. Related Art

A flat display device such as a liquid crystal display device are frequently used as a display device due to a slim and light structure as well as a lower power consumption. To display a data, a liquid crystal device may utilize an optical anisotropy and a polarity of liquid crystal molecules. The liquid crystal molecules are normally thin and long. The liquid crystal molecules have a pretilt angle such that the molecules are arranged to having a direction. Upon application of a driving voltage to the liquid crystal molecules, the pretilt angle may be changed and the liquid crystal molecules are arranged in a different direction. As a result, images are displayed and light polarized by the optical anisotropy of the liquid crystal is controlled. An active matrix liquid crystal display is often used because of a superior resolution and a picture quality. The active matrix liquid crystal display has a thin film transistor and a pixel electrode connected to the thin film transistor which are arranged in a matrix pattern.

The liquid crystal display device includes a liquid crystal panel having a upper substrate and a lower substrate. The upper substrate is referred to as a color filer substrate, and the lower substrate is referred to as an array substrate. The upper substrate and the lower substrate are spaced apart from each other and a liquid crystal is interposed therebetween. The upper substrate includes a common electrode and the lower substrate includes a pixel electrode. When a driving voltage is supplied to the common electrode on the upper substrate and the pixel electrode on the lower substrate, an electric field, which is perpendicular to the electrodes, is formed by a difference of the supplied voltage. The electric field controls the arrangement direction of the liquid crystal molecules. When the liquid crystal is driven by the perpendicular electric field, a transmittance and an aperture ratio may increase but a viewing angle may decrease. Accordingly, a driving method of a liquid crystal using in-plane switching (IPS) with a horizontal electric field is used.

FIG. 1 is a cross-sectional view illustrating a liquid crystal panel 1 of an in-plane switching mode liquid crystal display device according to the related art. The liquid crystal panel 1 includes a color filter substrate 9 having a color filter and an array substrate 10 having a thin film transistor. The color filter substrate 9 and the array substrate 10 are configured to face each other. A liquid crystal layer 11 is disposed between the color filter substrate 9 and the array substrate 10. A common electrode 17 and a pixel electrode 30 are disposed horizontally on the array substrate 10, and a horizontal electric field L is formed by a difference of voltage supplied to the common electrode 17 and the pixel electrode 30. Accordingly, the in-plane switching mode liquid crystal display device operates to control the liquid crystal molecules within the horizontal electric field L.

FIGS. 2A and 2B illustrate 'on' and 'off' states of the in-plane switching mode liquid crystal display device according to the related art. FIG. 2A illustrates an arrangement state of a liquid crystal in an 'on' state. A voltage is supplied and the arrangement of each liquid crystal 11a corresponding to a common electrode 17 and a pixel electrode 30 remains unchanged. Liquid crystals 11b between the common electrode 17 and the pixel electrode 30 are arranged in the same direction of a horizontal electric field L. The horizontal electric field L is formed by a voltage supplied between the common electrode 17 and the pixel electrode 30. Accordingly, the in-plane switching mode liquid crystal display device has a broad viewing angle because the arrangement of the liquid crystal is changed in response to the horizontal electric field. As a result, the in-plane switching mode liquid crystal display device may be viewed from top, bottom, left and right positions with an angle of about 80° to 85° without a reversal process. FIG. 2B illustrates an arrangement state of a liquid crystal in an 'off' state. No voltage is applied and the arrangement state of a liquid crystal layer 11 is unchanged. No horizontal electric field between the common electrode 17 and the pixel electrode 30 is formed.

FIG. 3 is a plan view of an in-plane switching mode liquid crystal display device according to the related art. The common electrode 17 and the pixel electrode 30 are formed on the array substrate 10. The common electrode 17 and the pixel electrode 30 may shield a pixel region P, so that an aperture ratio decreases. As the amount of light passing through the liquid crystal display device is reduced with the electrodes, a brightness may decrease.

A twisted nematic ("TN") liquid crystal may be often used with a liquid crystal display device and an in-plane switching mode liquid crystal display device. Because the TN liquid crystal has a response time of over 30 ms, which is relatively slow, the liquid crystal display device using the TN liquid crystal may present a low display quality that develops an afterimage in implementing a fast movement display such as an animation. To improve the response speed, a ferroelectric liquid crystal ("FLC") mode liquid crystal display device is used. The FLC mode liquid crystal display device uses a ferroelectric liquid crystal having a superior response speed.

The ferroelectric liquid crystal is referred to as a chiral smectic C liquid crystal. The response time of the ferroelectric liquid crystal molecules is fast. Each layer of the chiral smectic C liquid crystal is arranged with an angle. When an electric field applies to the chiral smectic C liquid crystal, a dipole moment is arranged in one direction, and a molecular alignment is uniform and is maintained after the electric field is eliminated. Further, when an electric field is supplied in an opposite direction to the chiral smectic C liquid crystal, the molecular alignment may be reversed in an opposite direction at a high speed. The molecular alignment of the ferroelectric liquid crystal differs according to a polarization of an electric field, and the FLC mode liquid crystal display device shows the fast response.

FIG. 4 is a cross-sectional view illustrating a FLC mode liquid crystal display device using a ferroelectric liquid crystal according to the related art. As shown in FIG. 4, a ferroelectric liquid crystal 80 with a gap d1 is disposed between a first alignment layer 55 on an array substrate 50 and a second alignment layer 75 on a color filter substrate 70. In the FLC mode liquid crystal display device, the gap d1 of a liquid crystal panel 40 should be smaller than 2 μm. Further, it may be difficult to inject the ferroelectric liquid crystal 80 because it has almost gel state at the normal temperature.

Accordingly, there is a need of a liquid crystal display that provides advantages of an FLC mode liquid crystal display device and an in-plane switching mode liquid crystal display device such as a broad viewing angle, high brightness, and a fast response velocity.

SUMMARY OF THE INVENTION

By way of introduction only, an in-plane switching mode liquid crystal display device includes a first substrate including a pixel electrode in a pixel region; a second substrate facing the first substrate and including a common electrode; a first alignment layer disposed on the pixel electrode; a second alignment layer disposed on the common electrode; a first ferroelectric liquid crystal layer coated on the first alignment layer and including a first spontaneous polarization; a second ferroelectric liquid crystal layer coated on the second alignment layer and including a second spontaneous polarization; and a twisted nematic liquid crystal layer interposed between the first and second ferroelectric liquid crystal layers. In the in-plane switching mode liquid crystal display device, a rotational velocity of the first spontaneous polarization is different from a rotational velocity of the second spontaneous polarization, and a direction of the first spontaneous polarization is the same as a direction of the second spontaneous polarization.

A fabrication method of an in-plane switching mode liquid crystal display device includes forming a pixel electrode on a first substrate; forming a common electrode on a second substrate; forming a first alignment layer on the pixel electrode; forming a second alignment layer on the common electrode; forming a first ferroelectric liquid crystal layer by coating a ferroelectric liquid crystal of an isotropic phase on the first alignment layer; forming a second ferroelectric liquid crystal layer by coating a ferroelectric liquid crystal of an isotropic phase on the second alignment layer; exposing the first ferroelectric liquid crystal layer to a first atmosphere to generate a first spontaneous polarization; exposing the second ferroelectric liquid crystal layer to a second atmosphere different from the first atmosphere to generate a second spontaneous polarization; attaching the first and second substrates such that the first and second ferroelectric liquid crystal layers face each other; and forming a twisted nematic liquid crystal layer between the first and second ferroelectric liquid crystal layers.

BRIEF DESCRIPTION OF THE DRAWINGS

The accompanying drawings, which are included to provide a further understanding of the invention and are incorporated in and constitute a part of this application, illustrate embodiments and together with the description serve to explain the principle of the invention. In the drawings.

DETAILED DESCRIPTION OF ILLUSTRATED EMBODYMENTS

A ferroelectric liquid crystal has a phase transition in accordance with a temperature. The phase transition of a ferroelectric liquid crystal includes an isotropic phase to a nematic phase (N*); the nematic phase (N*) to a smectic phase (SmC*) and the smectic phase (SmC*) to a crystal phase, according to a change of temperature such as change from a high temperature to a low temperature. Further, viscosity of the ferroelectric liquid crystal is changed according to the temperature. The viscosity is the lowest in the isotropic phase and the highest in the crystal phase. To provide the ferroelectric liquid crystal on a substrate, the isotropic phase state having the low viscosity is suitable. As noted above, the isotropic phase state may be obtained with heating at the high temperature. After a liquid crystal panel is formed, a phase at a normal temperature is the smectic phase (SmC*). A spontaneous polarization is revealed when the nematic phase (N*) makes a transition to the smectic phase (SmC*). The spontaneous polarization may help a liquid crystal director moving in one direction when a voltage applies. When the liquid crystal director moves in the one direction with the spontaneous polarization, the direction remains unchanged.

An in-plane switching mode liquid crystal display device having the ferroelectric liquid crystal and a twisted nematic liquid crystal is explained in conjunction with FIGS. 5A to 5C and 6A to 6C. The in-plane switching mode liquid crystal display device has a structure that the ferroelectric liquid crystal acts as a dynamic alignment and the twisted nematic liquid crystal between dynamic alignment layers is effectively controlled.

Figure 1:
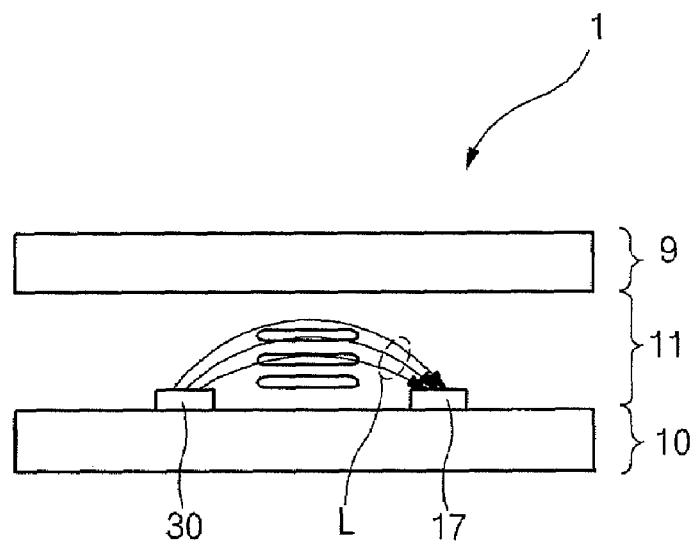
FIG. 1 is a cross-sectional view illustrating a liquid crystal panel of an in-plane switching mode liquid crystal display device according to the related art.
Figure 2A:
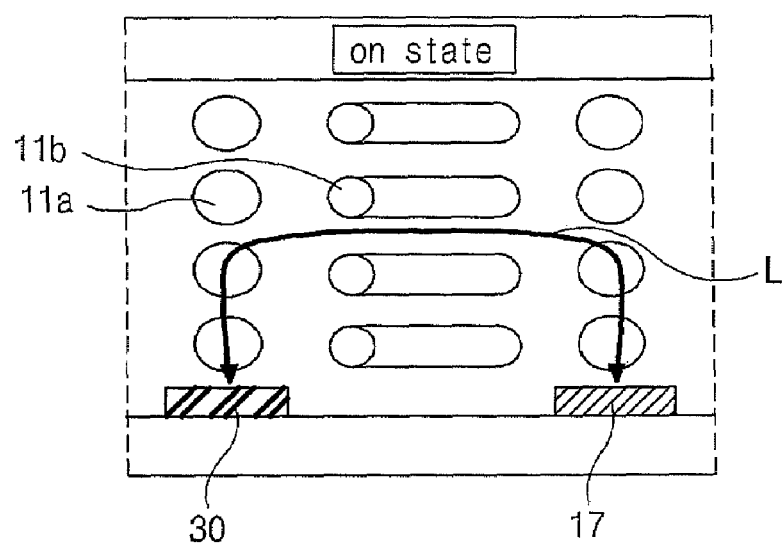
FIGS. 2A and 2B are cross-sectional views illustrating 'on' and 'off' states of in-plane switching mode liquid crystal display device according to the related art.
Figure 2B:
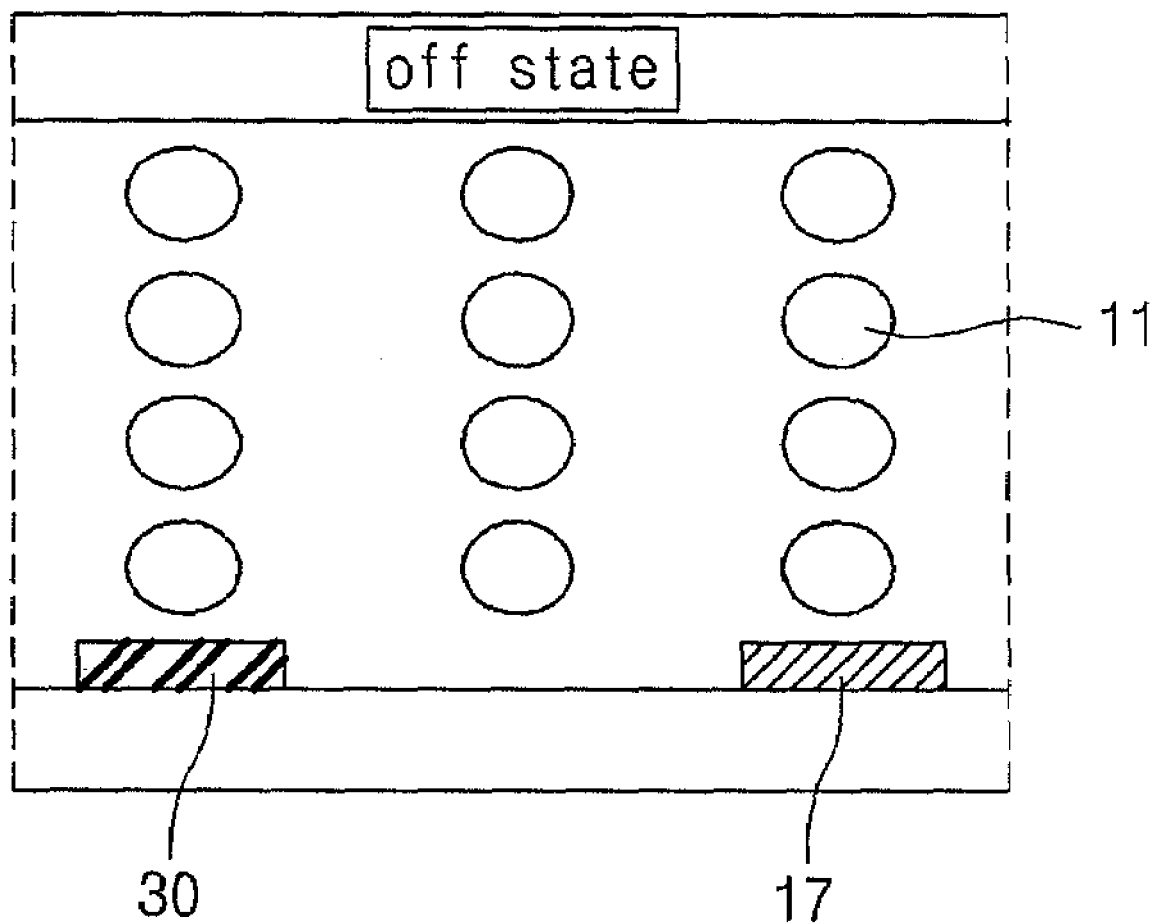
Figure 3:
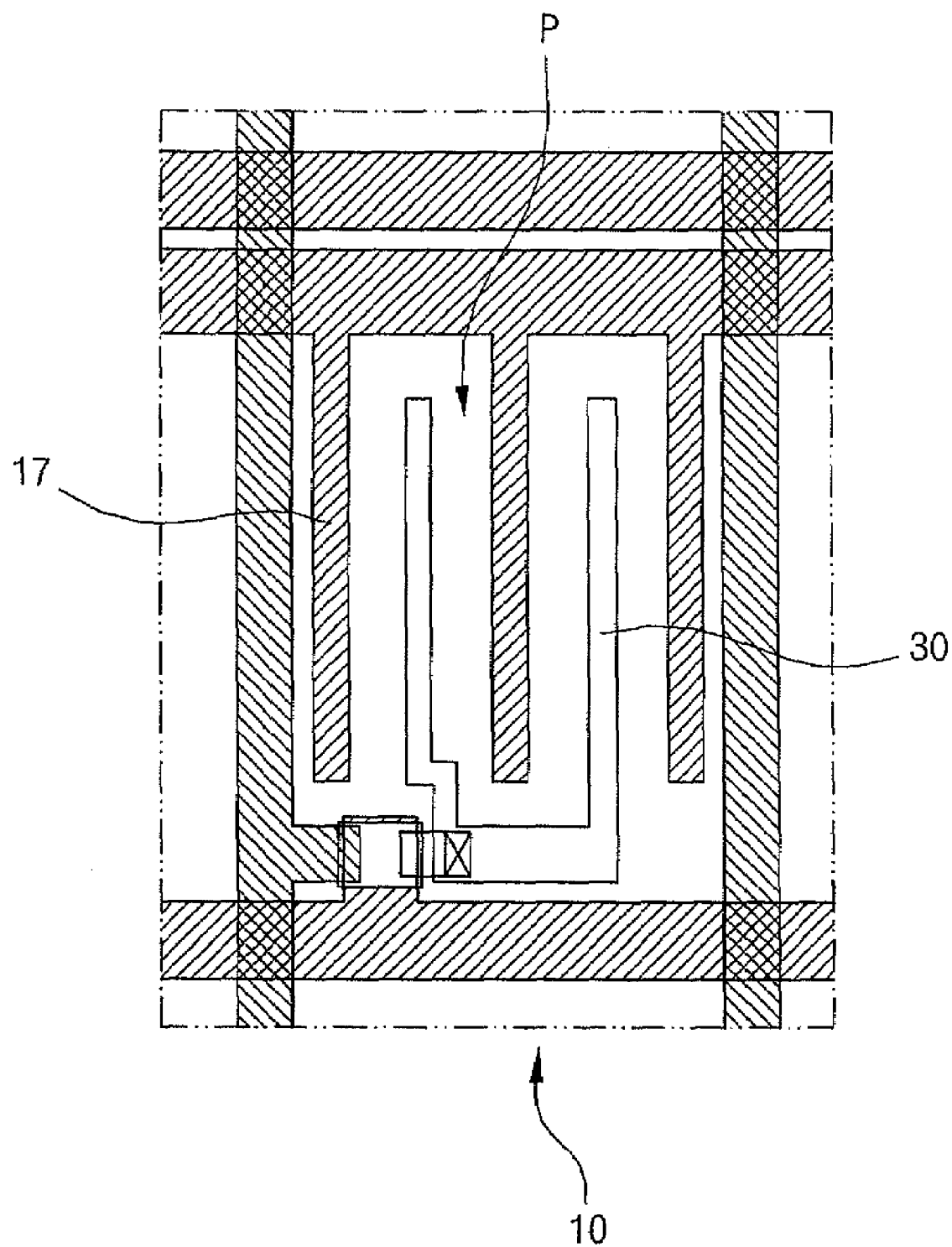
FIG. 3 is a plan view of an in-plane switching mode liquid crystal display device according to the related art.
Figure 4:
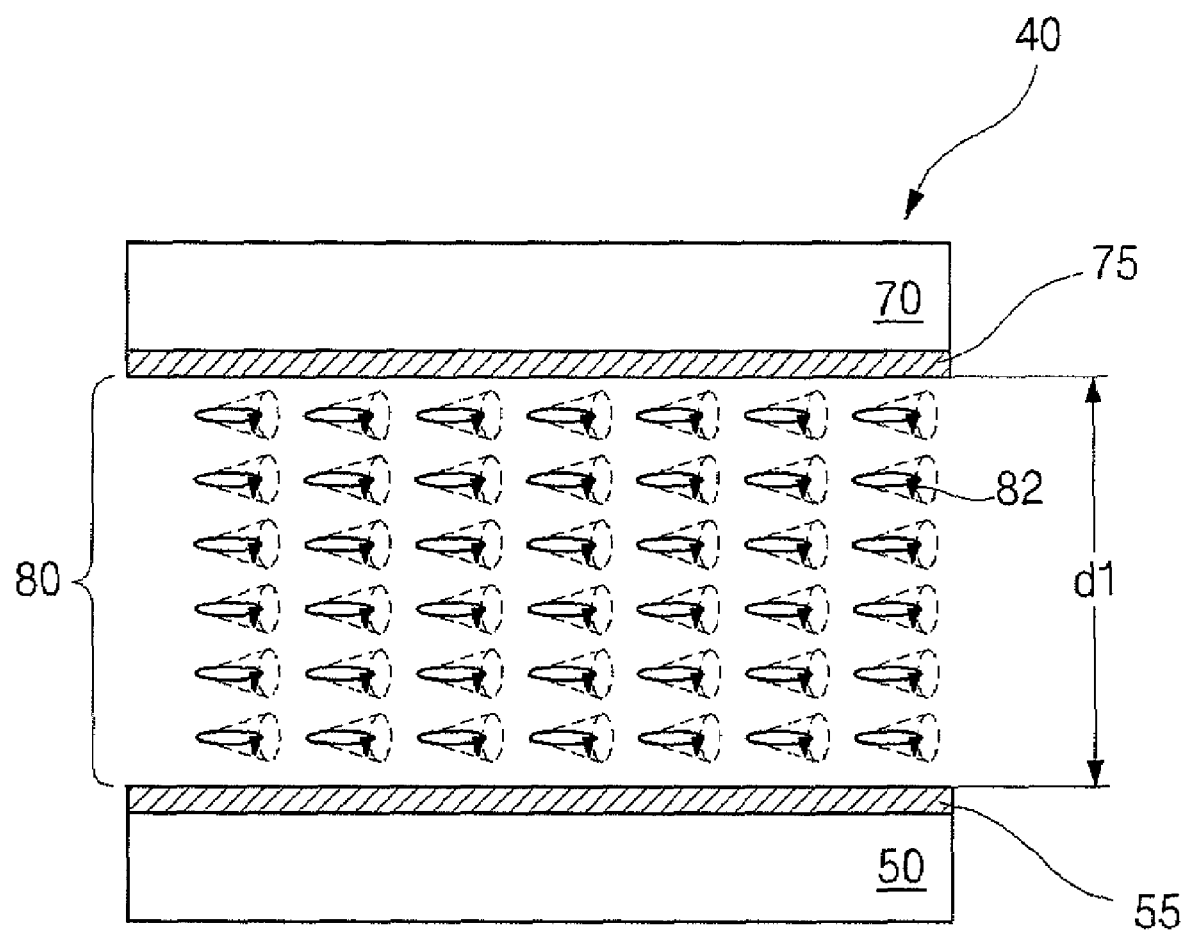
FIG. 4 is a cross-sectional view illustrating a FLC mode liquid crystal display device using a ferroelectric liquid crystal according to the related art.
Figure 4:
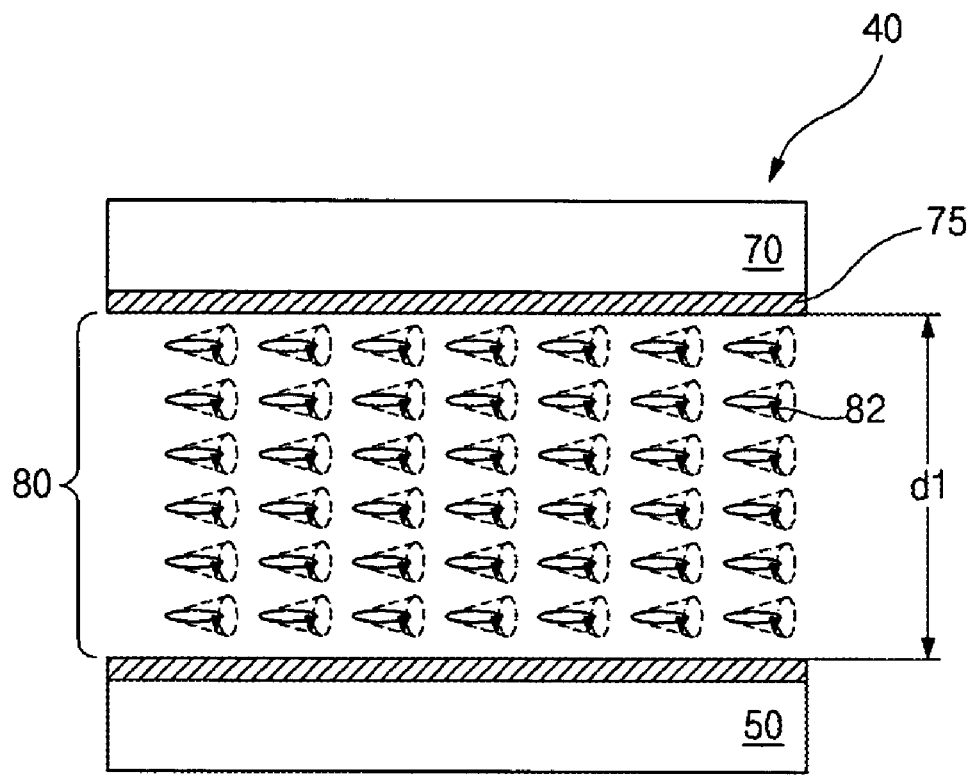
Figure 5A:
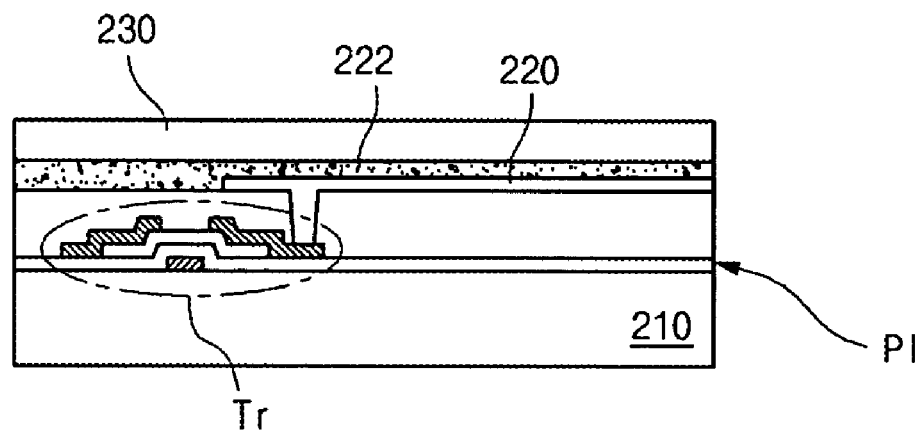
FIGS. 5A to 5C are cross-sectional views illustrating a forming process of a ferroelectric liquid crystal layer on an array substrate of an in-plane switching mode liquid crystal display device.
Figure 5B:
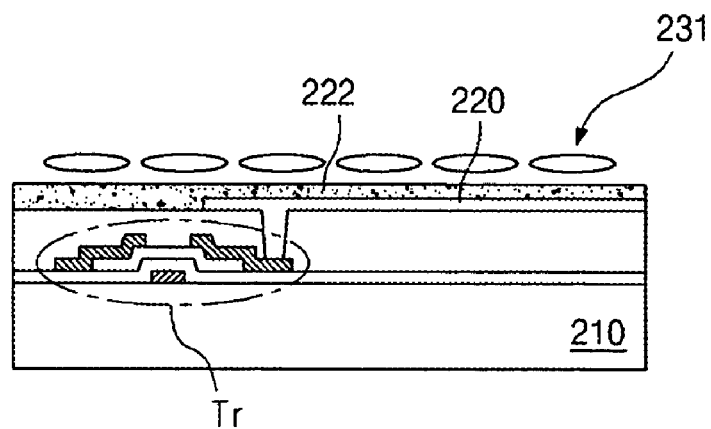
Figure 5C:
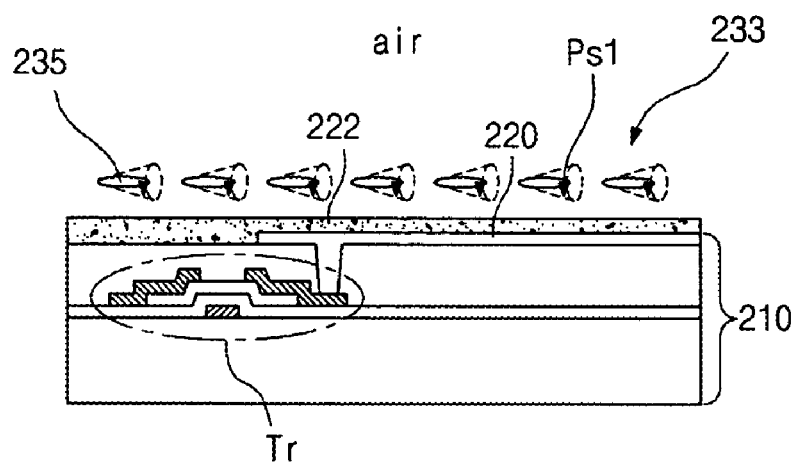

FIGS. 5A to 5C are cross-sectional views illustrating a forming process of a ferroelectric liquid crystal layer on an array substrate of an in-plane switching mode liquid crystal display device. As shown in FIG. 5A, polyimide (PI) of a high molecular substance is spread on an array substrate 210 including a thin film transistor (Tr) and a pixel electrode 220. An alignment layer 222 for an alignment of the ferroelectric liquid crystal is formed. A ferroelectric liquid crystal 230 of an isotropic phase is coated on the alignment layer 222 with a thickness of at most 1 μm. For example, the thickness of the alignment layer 222 may range 1000 Å to 3000 Å. The ferroelectric liquid crystal 230 is made from a monomolecular substance and has a low viscosity with heating at a high temperature. Further, the coating may be performed with devices such as a spin coating device, a bar coating device and a slit coating device. During the coating, a volatile solvent is added to the first ferroelectric liquid crystal layer 230 of the isotropic phase to decrease the viscosity.

Subsequently, as shown in FIG. 5B, the ferroelectric liquid crystal layer 230 of the isotropic phase makes a transition to a ferroelectric liquid crystal layer of a nematic phase (N*) 231 as the temperature gradually decreases. The ferroelectric liquid crystal layer of the nematic phase (N*) 231 further makes a transition to a ferroelectric liquid crystal layer of a smectic phase (SmC*) 233 as the temperature continuously decreases, as shown in FIG. 5C. During the transition from the nematic phase (N*) 231 to the smectic phases (SmC*) 233, the temperature may be lowered by supplying + or − electric field or exposing the ferroelectric liquid crystal layer 230 in the air. At this time, a spontaneous polarization (Ps) having a rotational direction to the alignment layer may develop. The ferroelectric liquid crystal of the nematic phase (N*) 231 contacts the alignment layer 222. Alternatively, or additionally, the ferroelectric liquid crystal is exposed in the air simultaneously. The alignment layer is a medium having a polarity, as opposed to a non-polarity medium such as air.

The air is a non-polarity medium and the alignment layer i.e., polyimide (PI) is the polarity medium. The spontaneous polarization (Ps) follows the direction of the polarity medium during the transition of the ferroelectric liquid crystal from the nematic phase (N*) to the smectic phase (SmC*). Further, since the spontaneous polarization (Ps) has a high polarity, a liquid crystal molecule is arranged in the direction based on the spontaneous polarization (Ps). When the electric field is supplied, a ferroelectric liquid crystal director 235 rotates or remains unmoved in the direction determined by the spontaneous polarization (Ps). When the polarization of the electric field is consistent with the revealed spontaneous polarization, the ferroelectric liquid crystal director 235 rotates in the direction of the spontaneous polarization. When the polarization of the electric field differs from the revealed spontaneous polarization, the ferroelectric liquid crystal director does not rotate.

Figure 6A:
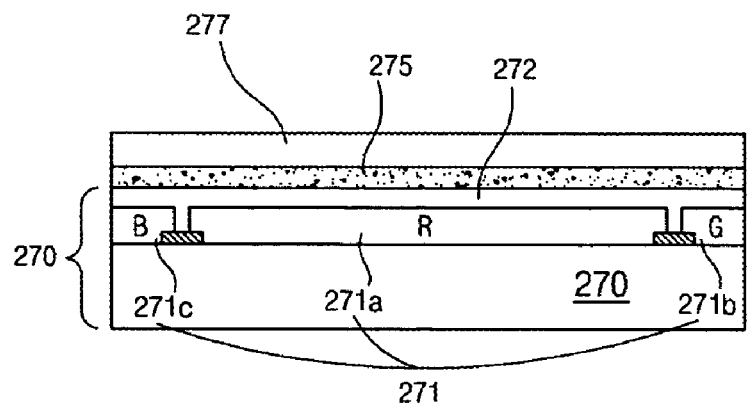
FIGS. 6A to 6C are cross-sectional views illustrating a forming process of a ferroelectric liquid crystal layer on a color filter substrate of the in-plane switching mode liquid crystal display device.
Figure 6B:
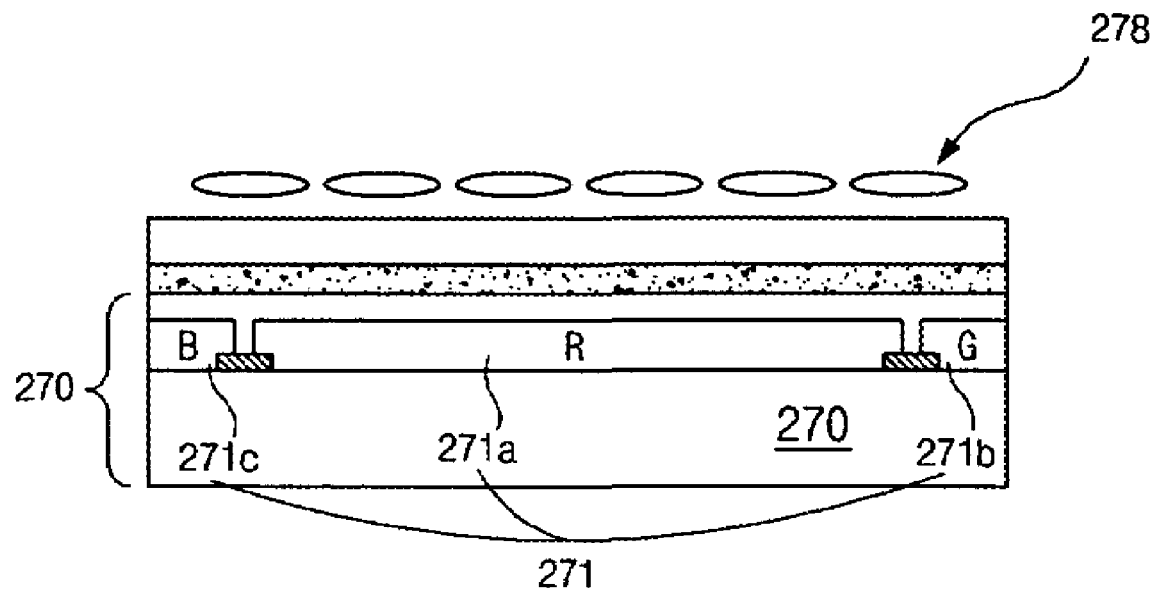
Figure 6C:
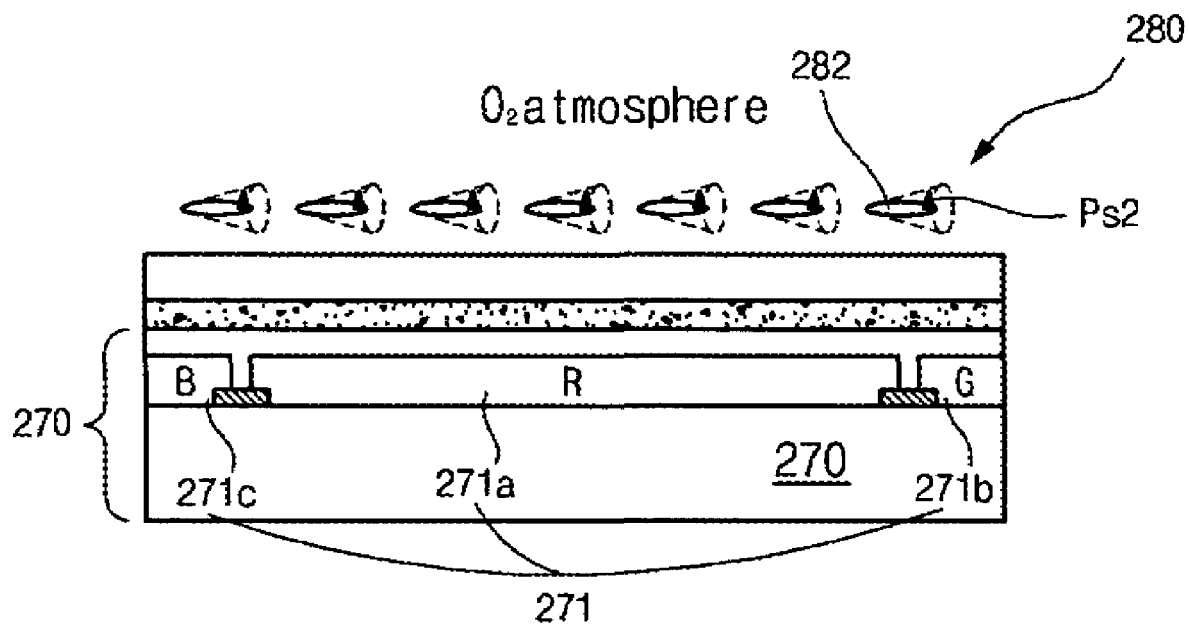

FIGS. 6A to 6C are cross-sectional views illustrating a forming process of a ferroelectric liquid crystal layer 277 on a color filter substrate of the in-plane switching mode liquid crystal display device. As shown in FIG. 6A, a second alignment layer 275 for alignment of the ferroelectric liquid crystal 277 is formed on an entire color filter substrate 270 and a common electrode 272 by spreading polyimide (PI) on the common electrode 272. The color filter substrate 270 includes a Red (R), Green (G) and Blue (B) color filters 271a, 271b and 271c. The ferroelectric liquid crystal of an isotropic phase 277 is formed on the second alignment layer 275. In the isotropic phase, the ferroelectric liquid crystal 277 has a low viscosity at a high temperature and is coated with the thickness of about 1000 Å to 3000 Å. Further, the coating may be easily performed with devices such as a spin coating device and a slit coating device by adding a solvent to decrease the viscosity.

As shown in FIG. 6B, the ferroelectric liquid crystal layer of the isotropic phase 277 makes a transition to a nematic phase (N*) 278 as the temperature gradually decreases. As shown in FIG. 6C, the ferroelectric liquid crystal layer of the nematic phase (N*) 278 further makes a transition to a smectic phase (SmC*) 280 as the temperature continuously decreases. When the ferroelectric liquid crystal layer of the nematic phase (N*) 278 makes a transition to a smectic phase (SmC*) 280, an electric field is supplied, or the ferroelectric liquid crystal layer is exposed in an atmosphere having a higher polarity than the second alignment layer 275 made of polyimide (PI). For example, the ferroelectric liquid crystal of nematic phase (N*) 278 may be exposed in an $O_2$ atmosphere having a higher polarity than air. A spontaneous polarization (Ps2) causes liquid crystal molecules to rotate in the direction of the substance with the high polarity. As a result, unlike the array substrate (210 of FIG. 5C), which the direction of the spontaneous polarization (Ps1) conforms to the first alignment layer 222, the direction of the spontaneous polarization (Ps2) conforms to the $O_2$ atmosphere rather than the second alignment layer 275.

The twisted nematic liquid crystal is disposed between the first and second ferroelectric liquid crystal layers of the array substrate (210 of FIG. 5C) and the color filter substrate (270 of FIG. 6C). The first ferroelectric liquid crystal layer follows the rotational directions of the spontaneous polarization Ps1 of FIG. 5C and the second ferroelectric liquid crystal layer follows the rotational directions of the spontaneous polarization Ps2 of FIG. 6C. A patterned sealant is formed on a rim of one of the two substrates, and then the two substrates are attached each other. Accordingly, the formation of the in-plane switching mode liquid crystal display device is completed.

Figure 7:
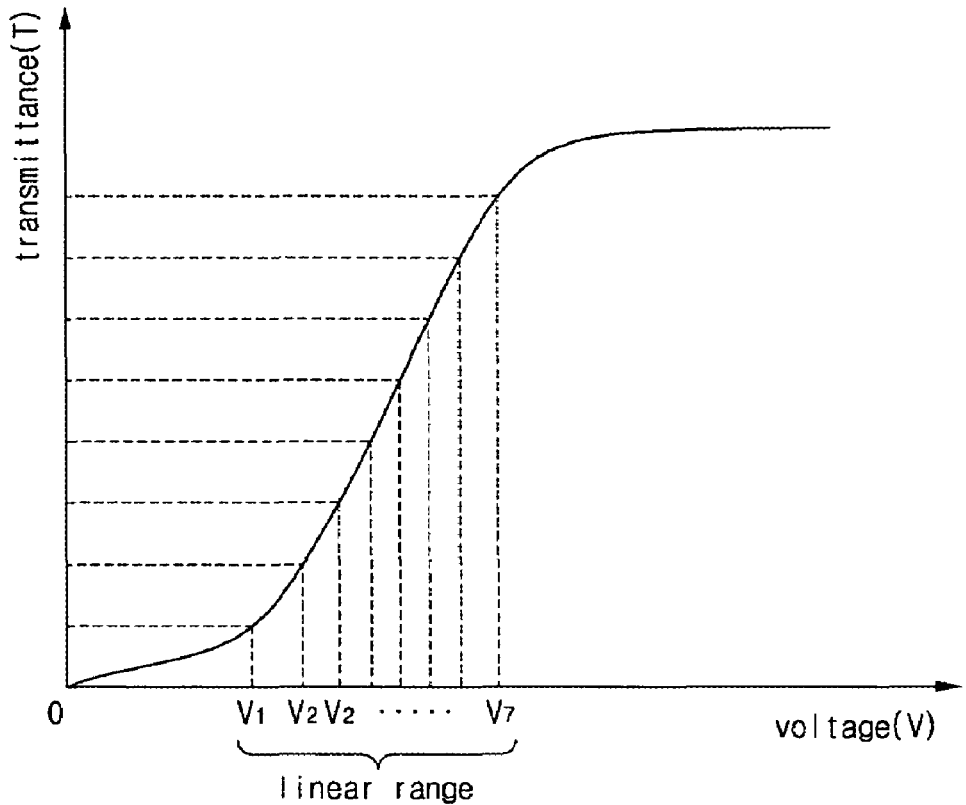
FIG. 7 is a graph illustrating an ideal curve of a supplied voltage-transmittance (V-T) in a liquid crystal display device.

FIG. 7 is a graph illustrating an ideal voltage-transmittance curve of a liquid crystal display device. A gray scale is defined as dividing a quantity of a light that human's eyes may recognize. The liquid crystal display device displays gray scale images by artificially controlling a degree to which light is transmitted to a liquid crystal. The liquid crystal display device controls a voltage to display the gray scale. The transmittance of the light changes relative to the intensity of an electric field supplied to the liquid crystal. The relationship between the supplied voltage and the transmittance as shown in FIG. 7 indicates characteristics of the liquid crystal display device. Such relationship is often referred to as V-T characteristics. As shown in FIG. 7, when a small voltage and/or a large voltage are supplied, the transmittance may not change on a large scale. On the other hand, when an intermediate voltage is supplied, the transmittance changes in proportion to the supplied voltage. To display a gray scale of a neutral brightness, this intermediate range, i.e., a linear range may be used. Further, to display images in detail, the gray scale of the linear range should be divided on a fine scale. The gray scale is displayed by dividing the linear range with several gradation. An intermediate gray scale is displayed by dividing the transmittance of the linear range at regular intervals and supplying the voltage corresponding to the transmittance. When the linear range has a very sharp slope, it is difficult to control the transmittance. This is because the difference of the voltage is too small to be controlled. It is desirable to have a gentle slope in the linear range. The in-plane switching mode liquid crystal display device offers the linear range having a gentle linear curve in the V-T curve.

Figure 8:
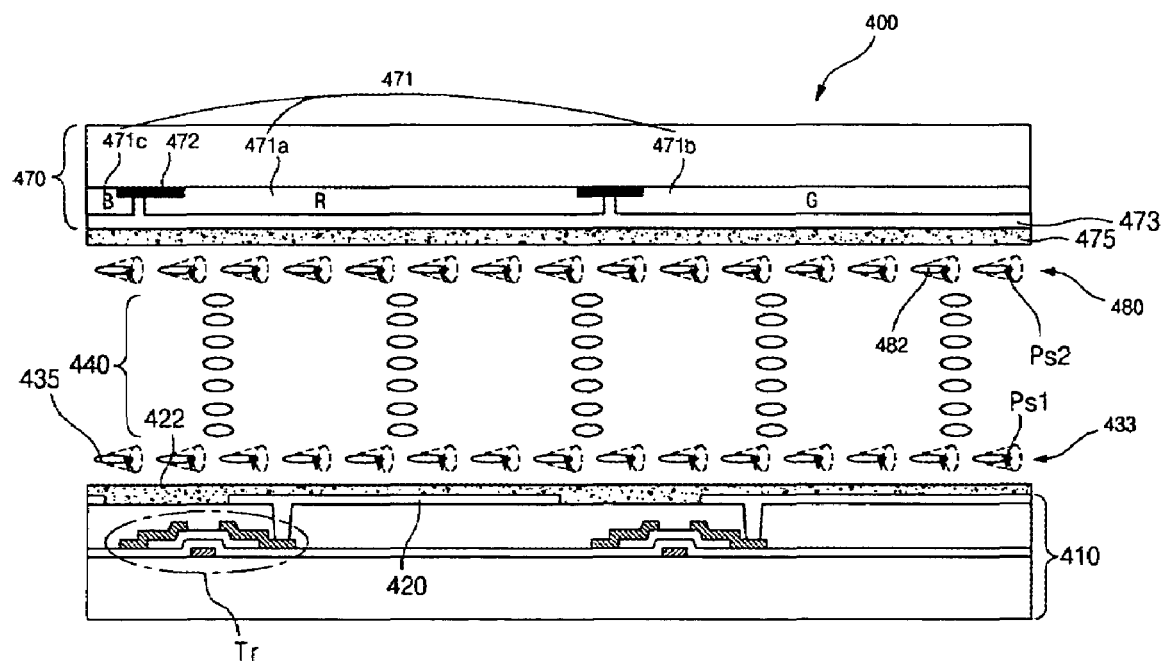
FIG. 8 is a cross-sectional view illustrating a pixel region of an in-plane switching mode liquid crystal display device.

FIG. 8 is a cross-sectional view illustrating a pixel area of an in-plane switching mode liquid crystal display device 400. In FIG. 8, first and second ferroelectric liquid crystal layers 433 and 480 of an array substrate 410 and a color filter substrate 470 are disposed opposite to each other. The first and second ferroelectric liquid crystal layers 433 and 480 are formed as described above in conjunction with FIGS. 5A to 5C and FIGS. 6A to 6C. The rotational directions of spontaneous polarizations Ps1 and Ps2 face each other. A twisted nematic liquid crystal layer 440 is formed by disposing a twisted nematic liquid crystal between the first and second ferroelectric liquid crystal layers 433 and 480. As a result, a liquid crystal panel is formed. The directions of the spontaneous polarizations Ps1 and Ps2 face a first alignment layer 422 between the array substrate 410 and the first ferroelectric liquid crystal layer 433. Liquid crystal directors 435 and 482 in the first and second ferroelectric liquid crystal layer 433 and 480 rotate in the same direction as that of the supplied voltage. The in-plane switching mode liquid crystal display device has a structure that the rotational speed of the spontaneous polarizations Ps1 and Ps2 revealed in the first and second ferroelectric liquid crystal layers 433 and 480 are not the same.

An Half V mode liquid crystal of a continuous director rotation ("CDR") mode group may be used in the first and second ferroelectric liquid crystal layers 433 and 480. The Half V mode liquid crystal has a property that a strength of the spontaneous polarization is freely controlled and the rest property of matter remains the same. The first and second ferroelectric liquid crystal layers 433 and 480 differ in the strengths of the spontaneous polarizations. A dynamic rotational power (i.e., rotational velocity) of the ferroelectric liquid crystal by an electric field differs according to the strength of the spontaneous polarization. The strengths of the spontaneous polarizations are generated differently from each other on the array substrate 410 and the color filter substrate 470, and the rotational velocity of the liquid crystal directors 435 and 482 in the first and second ferroelectric liquid crystal layers 433 and 480 differ from each other. Thus, the rotational velocity of the twisted nematic liquid crystal 440 between the first and second ferroelectric liquid crystal layers 433 and 480 is controlled, and a setting of a gamma voltage may be easy. A sharp brightness change may be prevented with a gradual increase of the transmittance relative to the supplied voltage i.e., the gentle slope of V-T curve.

A method of producing different strengths of the spontaneous polarizations in the Half V mode liquid crystal of the CDR mode group is explained. Each ferroelectric liquid crystal layer is exposed in atmospheres which are formed with polarity substance having a different strength of a polarity when the Half V mode liquid crystal of the CDR mode group has a phase transition that a nematic phase (N*) makes a transition to a smectic phase (SmC*). As a result, different strengths of the spontaneous polarizations are formed. The polarity, which is an electric asymmetry of molecules, may result from polarity groups including atoms such as O, S, halogen atoms, etc. The polarity groups may withdraw an electron in the molecules. Representative polarity groups are —OH, —COOH, —$NO_2$ and so on, and substances (i.e., gases) including the polarity groups differs in the strength of the polarity. Accordingly, the ferroelectric liquid crystal layer differing in the strength of the spontaneous polarization (i.e., a rotational velocity of the spontaneous polarization) is formed by exposing in the atmosphere of substances (i.e., gases) which have different strengths of the polarity.

Another method of producing spontaneous polarizations having different strengths with the Half V mode liquid crystal of the CDR mode group is explained. An electric field having a different intensity is supplied. A rotational direction of the spontaneous polarization is determined based on the supplied voltage when the ferroelectric liquid crystal layer has a phase transition that the nematic phase (N*) makes a transition to the smectic phase (SmC*). This method may affect a rotational angle besides the strength of the spontaneous polarization of the liquid crystal director. In the Half V mode liquid crystal of the CDR mode group, the strength of the spontaneous polarization is freely controlled and the rest property of matter remains the same. Regardless of the rotational angle, supplying different intensity of the electric field may be allowed when the spontaneous polarization is revealed.

Referring back to FIG. 8, the strength of the spontaneous polarization and the rotational velocity of the liquid crystal director 435 in the first ferroelectric liquid crystal layer 433 of the array substrate 410 may be stronger and faster than the strength of those of the liquid crystal director 482 in the second ferroelectric liquid crystal layer 480 of the color filter substrate 470. Alternatively, or additionally, the strength of the spontaneous polarization and the rotational velocity of the liquid crystal director 482 in the second ferroelectric liquid crystal layer 480 of the color filter substrate 470 may be stronger and faster.

Figure 9:
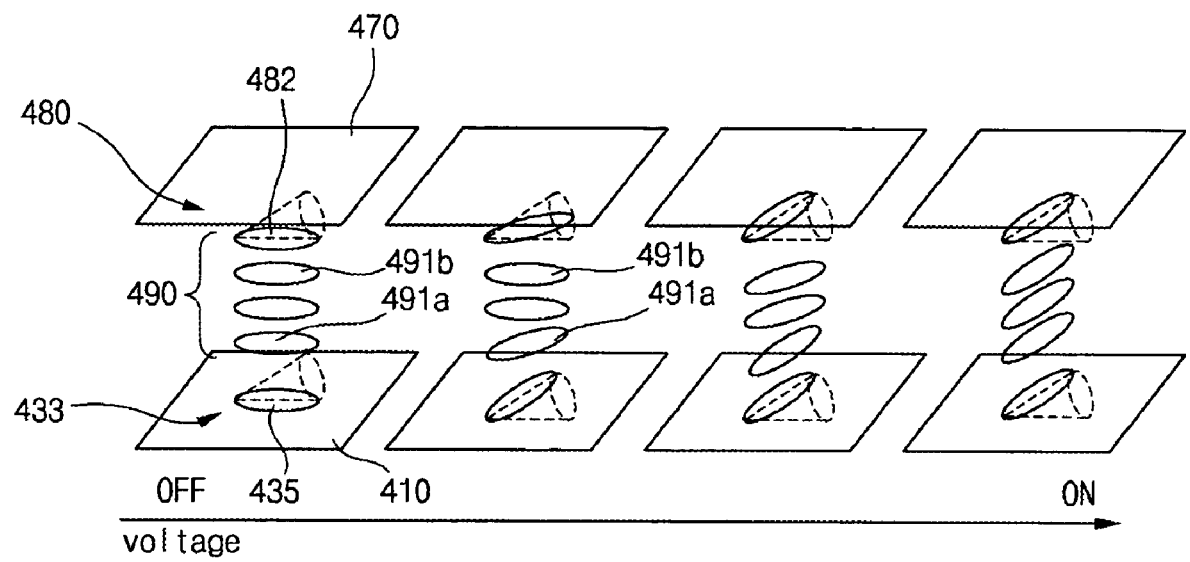
FIG. 9 is a view illustrating movements of liquid crystal directors in first and second ferroelectric liquid crystal layers and movements of liquid crystal molecules in a twisted nematic liquid crystal layer.
Figure 10:
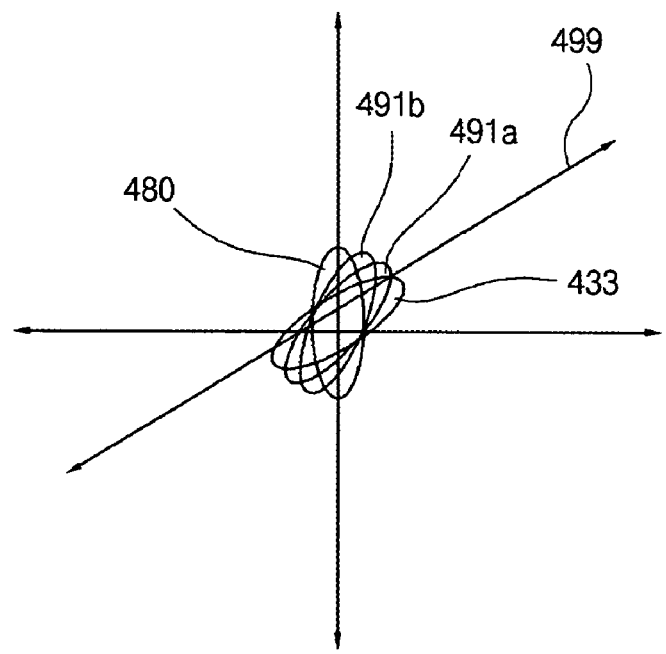
FIG. 10 illustrates movements of liquid crystal molecules in the twisted nematic liquid crystal layer of the in-plane switching mode liquid crystal display device in response to a supplied voltage.

FIG. 9 illustrates movements of liquid crystal directors in first and second ferroelectric liquid crystal layers 433, 480 and movements of liquid crystal molecules in the twisted nematic liquid crystal layer 490. As noted above, the twisted nematic liquid crystal layer 490 is disposed between the first and second ferroelectric liquid crystal layers 433, 480 of the in-plane switching mode liquid crystal display device 400. Voltage is supplied to the ferroelectric liquid crystal layers 433, 480 and the twisted nematic liquid crystal layer 490, and liquid crystal directors 435, 482 and molecules move in response to the supplied voltage. FIG. 10 illustrates movements of liquid crystal molecules 491a, 491b in the twisted nematic liquid crystal layer 490 for use with the in-plane switching mode liquid crystal display device 400 in response to the supplied voltage.

As shown in FIG. 9, when a voltage is supplied between a common electrode (not shown) and a pixel electrode (not shown) of an array substrate 410 and a color filter substrate 470, the liquid crystal director 435 in the first ferroelectric liquid crystal layer 433 is exposed in a stronger electric field and substances of polarity. The liquid crystal director 435 has the fast rotational velocity of the spontaneous polarization, (i.e., a strength of a spontaneous polarization) and it rotates with some angle. The liquid crystal director 482 in the second ferroelectric liquid crystal layer 480 may have the spontaneous polarization revealed in an atmosphere of a weaker electric field and non-polar substances than the first ferroelectric liquid crystal layer 433. The liquid crystal director 482 rotates slower than the liquid crystal director 435 in the first ferroelectric liquid crystal layer 433 in the same rotational direction. The rotation angle of the liquid crystal director 482 may be the same as that of the liquid crystal director 435 in the first ferroelectric liquid crystal layer 433.

Liquid crystal molecules 491a and 491b in the twisted nematic liquid crystal layer 490 are disposed between the first and second ferroelectric liquid crystal layers 433 and 480 and rotate in the same rotational direction of the liquid crystal directors 435 and 480 in the first and second ferroelectric liquid crystal layers 433 and 480. The liquid crystal molecule 491a in the twisted nematic liquid crystal layer 490 adjacent the first ferroelectric liquid crystal layer 433 rotates faster than the liquid crystal molecules 491b in the twisted nematic liquid crystal layer 490 adjacent the second ferroelectric liquid crystal layer 480. As described above, the first ferroelectric layer 433 may rotate faster than the second ferroelectric layer 480. The liquid crystal molecule 491a also starts rotating prior to the rotation of the liquid crystal molecule 491b. The twisted nematic liquid crystal layer 490 has the first rotating liquid crystal molecule 491a and then another rotating liquid crystal molecule 491b. As a result, twisting of the liquid crystal molecules occurs in the twisted nematic liquid crystal layer 490. An average optical axis of the twisted nematic liquid crystal 490 in response to the voltage may not change rapidly as shown in FIG. 10.

Figure 11:
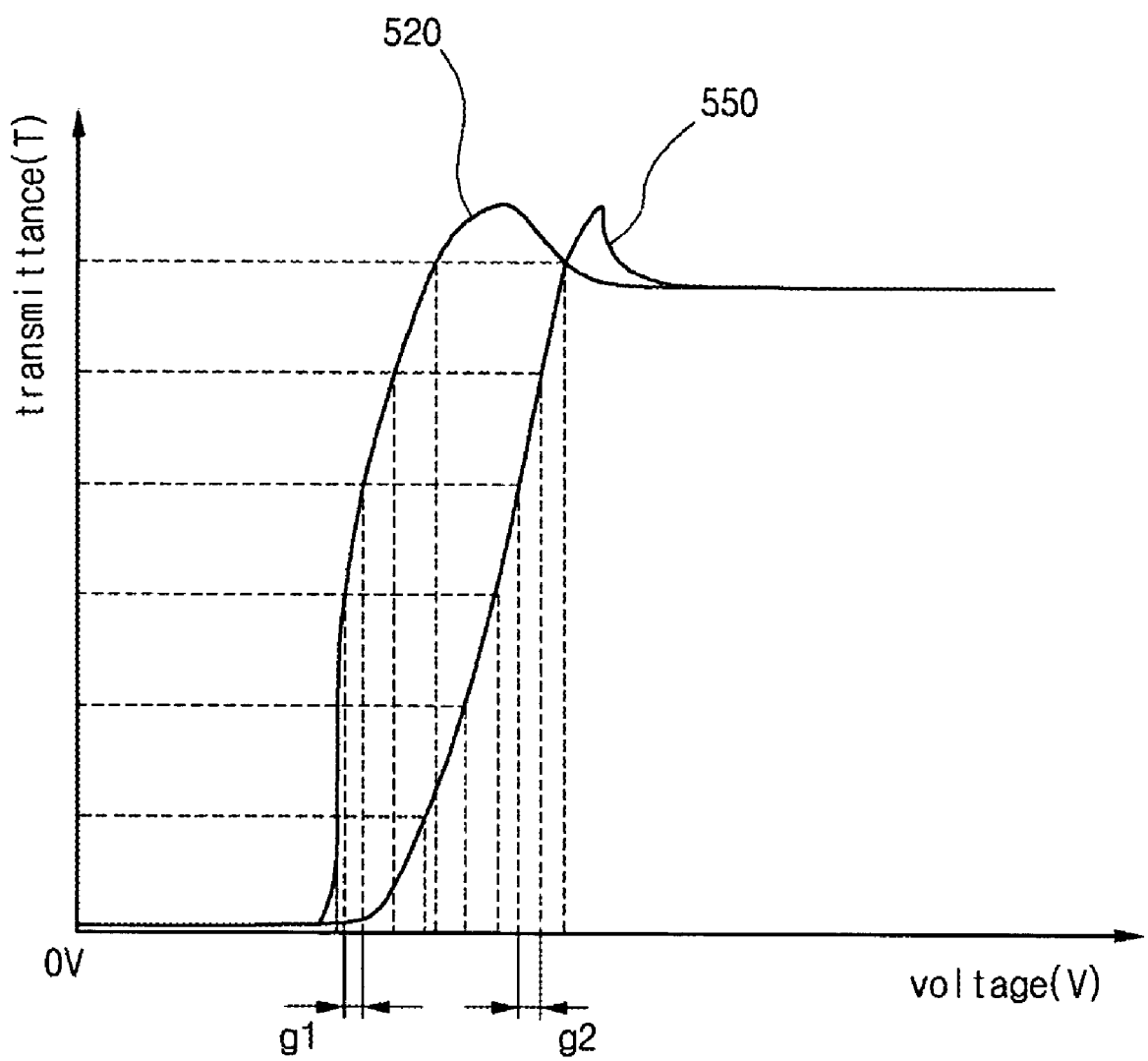
FIG. 11 is a graph illustrating a supplied voltage-transmittance (V-T) curve of a liquid crystal display device and a V-T curve of an in-plane switching mode liquid crystal display device.

FIG. 11 is a graph illustrating a voltage-transmittance (V-T) curve 520 of a liquid crystal display device of the related art and a V-T curve 550 of the in-plane switching mode liquid crystal display device. As noted above, the movement of the liquid crystal directors 433 and 480 and the liquid crystal molecules 491a and 491b in the first and second ferroelectric liquid crystal layers 433 and 480 and the twisted nematic liquid crystal layer 490 lead to twisting. The twisting of the liquid crystal molecules 491a and 491b may result in the gentle slope in the V-T curve as shown in the V-T curve 550. The V-T curve 550 has more gentle curve than the V-T curve 520 when each the transmittance is divided into the same intervals. Further, an interval of the supplied voltage g2 may be broader than an interval of the supplied voltage g1. A gamma voltage setting may be easier with the gentle curve. Because the interval g2 of the V-T curve 550 is broader than the interval g1 of the V-T curve 520, sudden change of the brightness decreases as the supplied voltage changes. If the interval between the voltages subdivided relative to the transmittance is small, a generation ratio of an error may be large and the brightness may deteriorate. Because of the broad interval g2, a tolerance of an error may be relatively greater and the brightness may increase.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A fabrication method of an in-plane switching mode liquid crystal display device, comprising:
   supplying a pixel electrode on a first substrate;
   supplying a common electrode on a second substrate;
   disposing a first alignment layer on the pixel electrode;
   disposing a second alignment layer on the common electrode;
   forming a first ferroelectric liquid crystal layer by coating a first ferroelectric liquid crystal of an isotropic phase on the first alignment layer;
   forming a second ferroelectric liquid crystal layer by coating a second ferroelectric liquid crystal of an isotropic phase on the second alignment layer;
   exposing the first ferroelectric liquid crystal layer to a first atmosphere to generate a first spontaneous polarization;
   exposing the second ferroelectric liquid crystal layer to a second atmosphere to generate a second spontaneous polarization wherein the second atmosphere is different from the first atmosphere;
   attaching the first and second substrates such that the first and second ferroelectric liquid crystal layers face each other; and
   interposing a twisted nematic liquid crystal layer between the first and second ferroelectric liquid crystal layers,
   wherein a rotational velocity of the first spontaneous polarization is different from a rotational velocity of the second spontaneous polarization.

2. The method according to claim 1, wherein disposing the first ferroelectric liquid crystal layer and disposing the second ferroelectric liquid crystal layer comprise forming the first and second ferroelectric liquid crystal layers to have a thickness ranging between 1000 Å and 3000 Å.

3. The method according to claim 1, wherein disposing the first alignment layer and disposing the second alignment layer comprise forming the first and second alignment layers from polyimide (PI).

4. The method according to claim 1, wherein exposing the first ferroelectric liquid crystal layer comprises forming the first atmosphere to include a first gas having a lower polarity than the first alignment layer.

5. The method according to claim 4, wherein exposing the second ferroelectric liquid crystal layer comprises forming the second atmosphere to include a second gas having a higher polarity than the second alignment layer.

6. The method according to claim 5, wherein the first gas is an air and the second gas is a gas including a polarity group —OH, —COOH, —NO$_2$, or O$_2$.

7. The method according to claim 1, wherein exposing the first ferroelectric liquid crystal layer comprises forming the first atmosphere to include a second gas having a higher polarity than the first alignment layer.

8. The method according to claim 7, wherein exposing the second ferroelectric liquid crystal layer comprises forming the second atmosphere to include a first gas having a lower polarity than the second alignment layer.

9. The method according to claim 8, wherein the first gas is an air and the second gas is a gas including a polarity group —OH, —COOH, —NO$_2$, or O$_2$.

10. The method according to claim 1, wherein exposing the first ferroelectric liquid crystal layer comprises forming the first atmosphere by applying a plus electric field.

11. The method according to claim 10, wherein exposing the second ferroelectric liquid crystal layer comprises forming the second atmosphere by applying a minus electric field.

12. The method according to claim 1, wherein exposing the first ferroelectric liquid crystal layer comprises forming the first atmosphere by applying a minus electric field and exposing the second ferroelectric liquid crystal layer comprises forming the second atmosphere by applying a plus electric field.

13. The method according to claim 1, wherein forming the first ferroelectric liquid crystal layer and forming the second ferroelectric liquid crystal layer comprise coating the first and second ferroelectric liquid crystal layers with one of a bar coating device, a spin coating device and a slit coating device.

14. The method according to claim 13, wherein coating the first and second ferroelectric liquid crystal layers further comprises adding a volatile solvent to the first and second ferroelectric liquid crystal layers of the isotropic phase to decrease viscosity.

15. The method according to claim 1, further comprising:
   forming gate and data lines intersecting each other to define a pixel region; and
   forming a switching element connected to the gate and data lines and the pixel electrode.

16. The method according to claim 1, wherein supplying the common electrode further comprises forming a color filter layer corresponding to a pixel region.

17. The method according to claim 1, wherein exposing the first ferroelectric liquid crystal layer and exposing the second ferroelectric liquid crystal layer comprises generating the first spontaneous polarization and generating the second spontaneous polarization when the first and second ferroelectric liquid crystal layers of the isotropic phase makes a transition to the first and second ferroelectric liquid crystal layers of a smectic phase.

18. The method according to claim 1, wherein forming the first and second ferroelectric liquid crystal layers comprise forming the first and second ferroelectric liquid crystal layers with an Half V mode liquid crystal of continuous director rotation (CDR) mode group.

* * * * *